United States Patent
Klotzki

(10) Patent No.: US 8,276,746 B2
(45) Date of Patent: Oct. 2, 2012

(54) SPIRAL CONVEYOR

(76) Inventor: Ulrich Klotzki, Neutraubling (DE)

( * ) Notice: Subject to any disclaimer, the term of this patent is extended or adjusted under 35 U.S.C. 154(b) by 267 days.

(21) Appl. No.: 12/805,375

(22) Filed: Jul. 28, 2010

(65) Prior Publication Data

US 2011/0024267 A1 Feb. 3, 2011

(51) Int. Cl.
*B65G 29/02* (2006.01)
(52) U.S. Cl. ........................................ 198/778
(58) Field of Classification Search .............. 198/778
See application file for complete search history.

(56) References Cited

U.S. PATENT DOCUMENTS

| | | | | |
|---|---|---|---|---|
| 1,892,206 A | * | 12/1932 | Dietz | 198/724 |
| 2,628,708 A | * | 2/1953 | Wahl et al. | 198/724 |
| 4,577,651 A | | 3/1986 | Mürtz | |
| 4,756,403 A | * | 7/1988 | Sasaki et al. | 198/724 |
| 5,291,987 A | | 3/1994 | Zink | |
| 5,297,668 A | * | 3/1994 | Zink | 198/724 |
| 2008/0184552 A1 | | 8/2008 | Lang | |

FOREIGN PATENT DOCUMENTS

| | | |
|---|---|---|
| DE | 3315413 | 10/1984 |
| DE | 000010116854 A1 | 4/2001 |
| EP | 1952900 | 8/2008 |
| GB | 1024113 | 3/1996 |

* cited by examiner

*Primary Examiner* — Mark A Deuble
(74) *Attorney, Agent, or Firm* — Welsh Flaxman & Gitler LLC

(57) ABSTRACT

Spiral conveyor for containers, including at least one transport path spirally enclosing a machine axis, the transport path is defined by, relative to the machine axis, outer container guide and/or slide elements and by, relative to the machine axis, inner guide and/or slide elements, and extends between a container input and a container output, and including at least one carrier, which extends over the entire length of the spiral formed by the transport path and reaches through the transport path or its spiral in the area between the outer container guide and/or slide elements and the inner container guide and/or slide elements and is held on at least two carrier elements which can be rotationally driven on the machine axis.

21 Claims, 6 Drawing Sheets

US 8,276,746 B2

SPIRAL CONVEYOR

BACKGROUND OF THE INVENTION

The invention relates to a spiral conveyor for containers. Spiral conveyors of this type are somewhat known in the art (DE 101 16 854 A1), namely being designed as devices for cleaning containers.

The disadvantage of known spiral conveyors is that the arrangement of functional elements not rotating with the at least one carrier, in particular stationary functional elements in the space, enclosed by the spiral-shaped transport path and also the supply of any supply lines within this space is possible only with a relatively complex design.

It is an object of the invention is to provide a spiral conveyor which avoids this disadvantage.

SUMMARY OF THE INVENTION

In a preferred embodiment, the spiral conveyor is part of a device for cleaning the containers. The special design of the device, or of the spiral conveyor, facilitates, for example, the arrangement of nozzles, also stationary, within the space surrounding the spiral-shaped transport path for spraying off the container and connection by means of simple connecting lines, in particular, by means of connecting lines without a rotary distributor or rotary connections, with the source which provides the treatment and/or cleaning liquid.

"Containers" according to the invention refers to receptacles, in particular receptacles with a cube-shaped or cubical outer contour, which are used for storage and/or transport of products, such as transport and/or storage boxes, beverage or bottle crates, etc.

"Turntable" according to the invention refers in general to a machine element which comprises at least two elements or bearing elements, which on mutually facing sides form respectively at least one sliding or bearing surface concentrically enclosing the rotary or machine axis and axially offset in relation to this axis, between which then preferably roll bodies are provided, for example in the form of balls.

The expression "essentially" as used in the invention means deviations from the exact value by +/−10%, preferably by +/−5% and/or deviations in the form of changes that are insignificant for the function.

In further embodiments of the invention the spiral conveyor is designed for example so that the radial distance of the bearings is equal to or essentially equal to the radius of the support ring, but at least greater than 50% of said radius, and/or the support ring is part of a turntable or is connected with such a turntable, and/or the support ring is mounted on bearing mechanisms offset on the machine axis and at a radial distance from the latter, said bearing mechanisms providing both axial and radial support of the support ring, and/or the at least one carrier is fastened on the support ring on the one hand and on a wheel which can be rotationally driven on the machine axis on the other hand, and/or the at least, one carrier is fastened on at least two support rings, and/or the at least one carrier is held at least on both ends on a carrier element respectively, and/or the machine axis is a vertical or horizontal axis, and/or the container input and/or the container output are designed for a transport direction of the containers tangential or essentially tangential to the transport direction of the transport path, and/or the container input comprises at least one transport element, preferably in the form of a conveyor belt, which is oriented tangentially or essentially tangentially relative to the outer container guide and/or slide elements, and/or the container input comprises at least one transport element, preferably a conveyor belt, which is oriented tangentially or essentially tangentially relative to the inner container guide and/or slide elements, and/or the transport elements respectively end at the outer container guide and/or slide elements, and/or the container output forms at least one sliding or transport plane for the containers, and/or at least one slot for example is provided in the transport or sliding plane for the at least one carrier intersecting said transport plane, and/or the container input and the container output are provided on a common side of a machine frame of the spiral conveyor, and/or the container input and the container output are provided at different height levels, preferably the container output being higher than the container input, and/or a common drive or separate, synchronized drives are provided for the carrier elements, and/or the spiral conveyor is designed as a device for treating, in particular for cleaning and/or drying, the containers, and/or within a space surrounded by the transport path, functional elements are provided for treating, especially for cleaning and/or drying the containers as well as supply lines or channels, especially for said functional elements, and/or beneath the lower carrier element, preferably below the support ring, a wall is provided, preferably designed as a trough, and/or at least one lower carrier element is designed as a support ring, and that the above characteristics can be used individually or in any combination.

Further embodiments, advantages and possible applications of the invention are disclosed in the following description of exemplary embodiments and in the figures. All characteristics described and/or pictorially represented, alone or in any combination, are subject matter of the invention, regardless of their being summarized or referenced in the claims.

BRIEF DESCRIPTION OF THE DRAWINGS

The invention is described in more detail below based on an exemplary embodiment with reference to the drawings, in which.

DETAILED DESCRIPTION OF THE INVENTION

Figure 1:
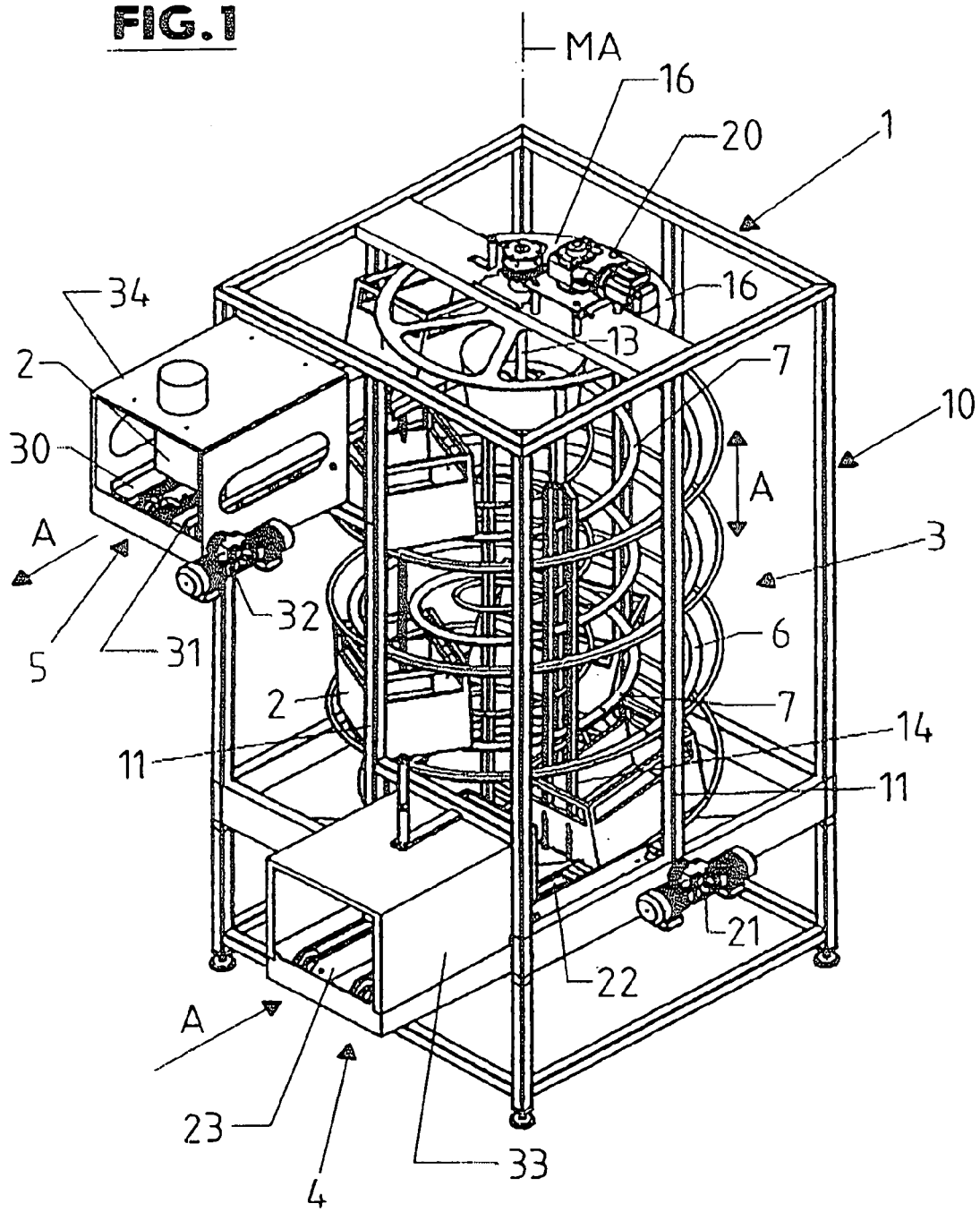
FIG. 1 shows in a simplified perspective view a spiral conveyor according to the invention.
Figure 2:
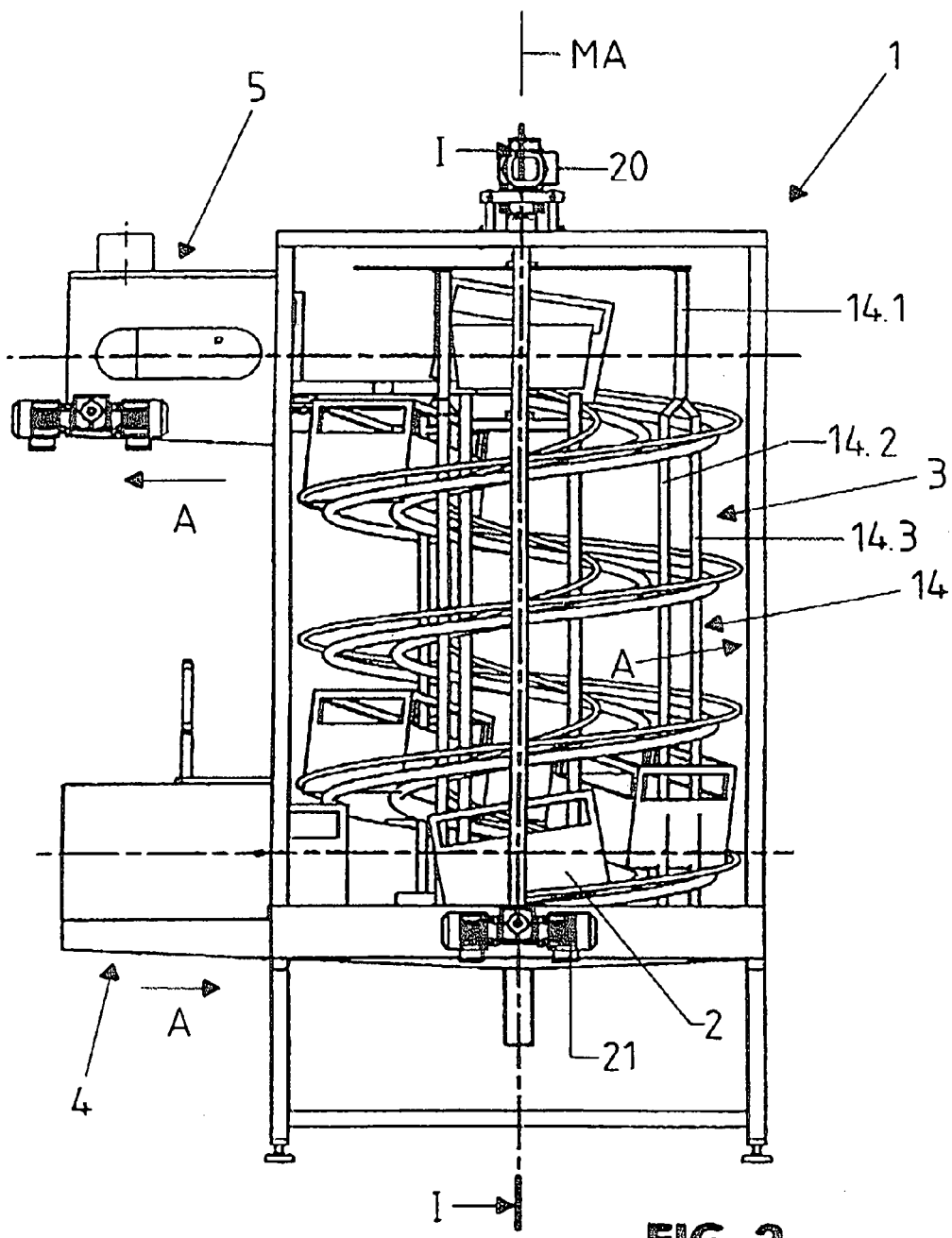
FIG. 2 shows the spiral conveyor in side view.

The spiral conveyor generally designated 1 in the drawings is used for conveying receptacles or containers 2 in the form of crates, for example in the form of transport crates, also bottle crates, on a transport path spirally enclosing a vertical machine axis MA and generally designated 3 in the drawings. The containers 2, which have the usual shape of transport crates or bottle crates, are fed to the spiral conveyor 1 or its transport path by an external conveyor (not depicted) in a transport direction A via a lower container input 4. The containers 2, after they have passed the transport path 3 in the transport direction A, are transferred from the transport path 3 via an upper container output 5 in transport direction A to an external conveyor (not depicted) for further use and/or treatment. In the depicted embodiment the containers 2 in top view are rectangular and are moved on the transport path 3 in normal position, i.e. with the container opening facing upward, so that the narrower circumferential sides of the containers 2 are oriented perpendicular to the transport direction A.

In detail, the transport path 3 consists among others of two spiral slideways 6 and 7 extending around the machine axis MA from the container input 4 to the container output 5, at the same level between the container input 4 and the container output 5 respectively and with a distance between each other which is smaller than the width of the containers 2 in transport direction A, so that during the movement on the transport path 3 the containers 2 stand upright with their downward facing container bottom in the area of their longer circumferential sides on the two slideways 6 and 7.

The transport path 3 further consists of two guide rails 8 and 9 likewise spirally enclosing the machine axis MA and essentially reaching from the container input 4 to the container output 5 and extending above the spiral transport or sliding plane formed by the slideways 6 and 7 and forming supports for the longer circumferential sides of the containers 2. The elements of the transport path 3 and in particular the two slideways 6 and 7 as well as the corresponding guide rails 8 and 9 are held on a machine frame 10 of the spiral conveyor 1, namely the—relative to the machine axis MA—outer slideway 6 and the guide rail 8 adjacent to said slideway on outer braces 11 extending parallel to the machine axis MA and the inner slideway 7 and the corresponding guide rail 9 on an inner support construction 12, which is joined directly to the machine frame 10 below and by means of a fixed shaft 13 above. The slideways 6 and 7 and the guide rails 8 and 9 in the depicted embodiment are respectively manufactured from a tubular profile.

The transport path 3 further comprises a plurality of drivers or carriers 14, for example three carriers 14, which are distributed around the machine axis MA at even angle distances and respectively extend, oriented parallel to the machine axis MA, through the space between the slideways 6 and 7 and the guide rails 8 and 9 from the top of the spiral conveyor 1 or of the transport path 3 to the bottom of the spiral conveyor 1 or of the transport path 3.

Figure 7:
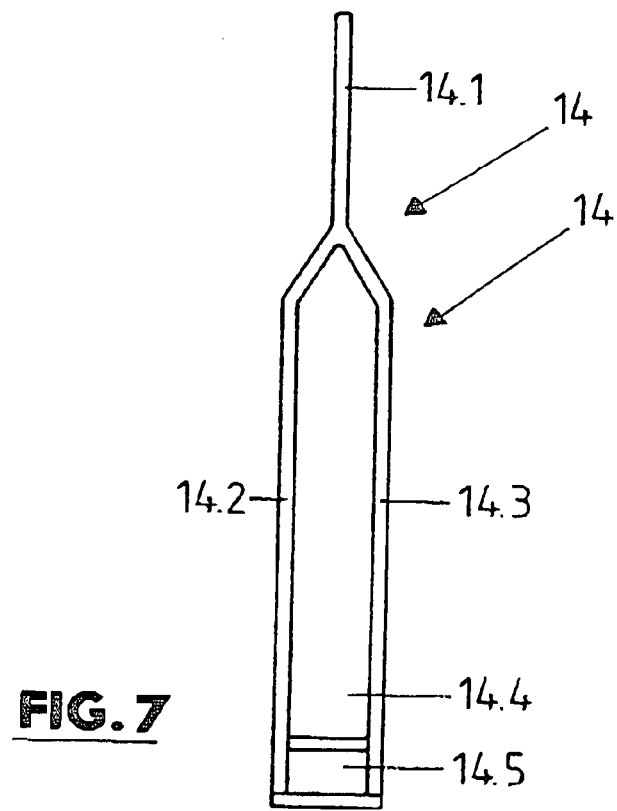
FIG. 7 shows in a component drawing a carrier of the spiral conveyor of FIGS. 1-6.
Figure 5:
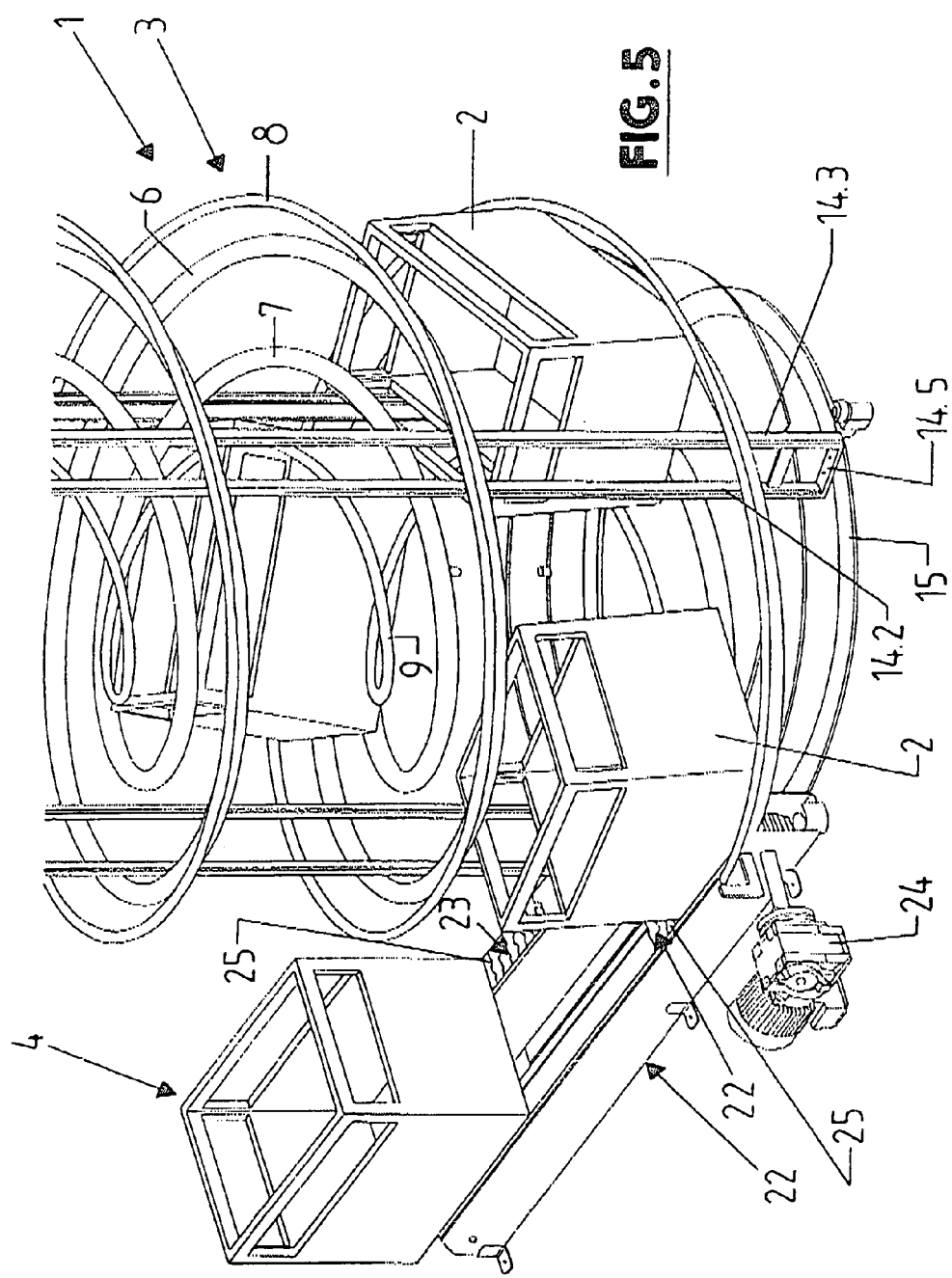
FIGS. 5 and 6 show in a schematic partial view the spiral conveyor in the area of a container input (FIG. 5) or of a container output (FIG. 6), respectively.
Figure 6:
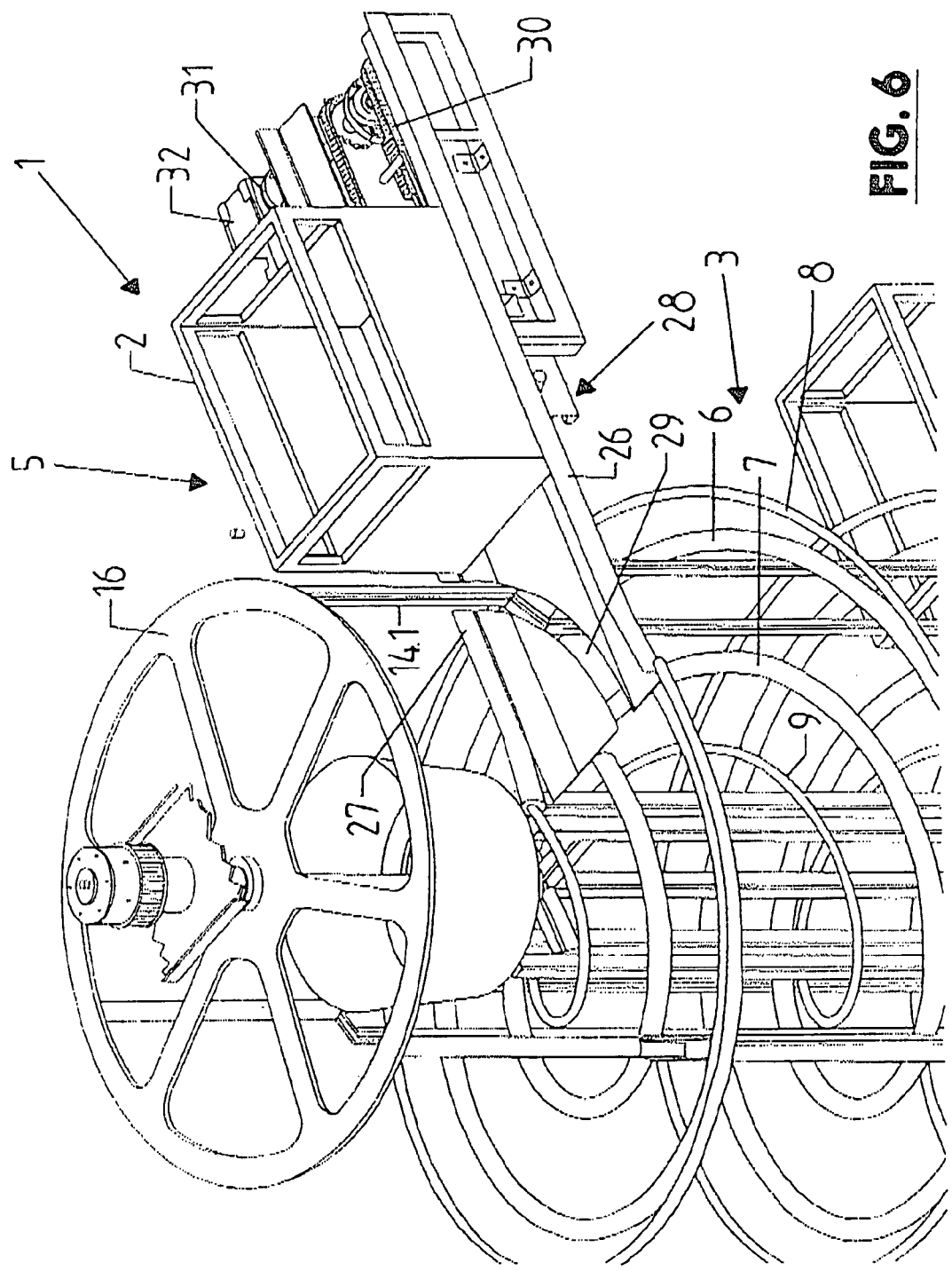

As shown especially in FIG. 7 in detail, each carrier 14 is designed in the shape of a tuning fork, namely consisting of an upper—relative to the total length of the carrier 14—short carrier section 14.1, which forks at its lower end into two mutually distant parallel carrier sections 14.2 and 14.3, which are connected with each other by means of two cross stays 14.4 and 14.5 at the lower end facing away from the carrier section 14.1.

With the lower end, i.e. with the stay 14.2 located there, the carriers 14 are respectively fastened on a carrier support or support ring 15 concentrically enclosing the machine axis MA at a radial distance and provided beneath the container input 4 or beneath the path of movement there of the containers 2, which (support ring) also encloses the middle support construction 12 likewise at a radial distance. On the upper end of the carrier section 14.1 facing away from the stays 14.4 and 14.5 the carriers 14 are respectively fastened to a carrier support or wheel 16, which is rotatably mounted on the shaft 13 around the machine axis MA. The two carrier sections 14.1 and 14.3 form bearing surfaces for the containers 2 which are further moved on the transport path 3 by pushing with the carriers 14. Immediately before reaching the container output 5 only the carrier section 14.1 is still bearing against the respective container.

The carriers 14 are fastened on the support ring 15 and on the wheel 16 so that the plane defined by the carrier sections 14.2 and 14.3 lies parallel to the edge area against which the respective carrier 14 bears against the narrow trailing side of a container 2 in transport direction A.

For the bearing support of the lower support ring located at the level beneath the container input 4, there are at least three bearing elements 17 provided on the machine frame and offset around the machine axis MA preferably at even angle distances, which (bearing elements) in the depicted embodiment respectively comprise a roller 18 which can rotate freely on a horizontal or essentially horizontal axis radial to the machine axis MA for axial support of the support ring 15 and a roller 19 which can rotate freely on an axis parallel to the machine axis MA for radial support of the support ring 15 on the inside or outside of the ring.

The lower support ring 15 and the upper wheel 16 are driven synchronously on the machine axis MA in transport direction A by means of a machine drive, so that together with the support ring 15 and the wheel 16, the carriers 14 also move in the space formed between the slideways 6 and 7 and the guide rails 8 and 9 for carrying the container 2 on the transport path 3. This machine drive can be implemented in many different ways, for example by independent, but synchronized electric motor drives for the wheel 16 and the support ring 15, as indicated in the drawings by the two drives 20 and 21, or by a single drive, for example an electric motor drive, with which both the support ring 15 and the wheel 16 are connected by a driven linkage. In any case, the direct drive of the support ring 15 is achieved by the fact that the latter is provided with gearing, into which a pinion gear of the drive or drive train engages. If the gearing is provided on the ring surfaces of the support ring 15 which is also used for the radial guiding, then the rollers 19 are designed as gearwheels, in which case then at least one of these gearwheels is the pinion gear driving the support ring 15.

The container input 4, by means of which the containers 2 are fed to the transport path 3 approximately tangentially to the circular path of the carriers 14 with their narrower circumferential sides oriented perpendicular or crosswise to the transport direction A, consists essentially of two mutually distant and synchronously driven conveyor belts 22 and 23 which are perpendicular to transport direction A and which respectively comprise a transport element, for example in the form of a slat belt, forming an endless loop and endlessly driven by an electric motor drive 24. Both conveyor belts 22 and 23 extend only as far as directly up to the outer slideway 6. Due to the tangential arrangement or alignment of the container input 4 and of the conveyor belts 22 and 23 relative to the circular path of the carriers 14, the conveyor belt 22 is longer than the other conveyor belt 23. The feeding of the containers 2 from the container input 4 into the transport path 3 is achieved by the conveyor belts 22 and 23. The design and arrangement of the conveyor belts 22 and 23 ensure that each container 2, during the transfer from the container input 4 to the transport path 3, is sufficiently supported at all times at the container bottom on the conveyor belts 22 and 23 or on the slideways 6 and 7, namely first at the container bottom on the two conveyor belts 22 and 23, then during the initial feeding into the transport path 3 with the container bottom at least in the area of the trailing side in transport direction A still on the two conveyor belts 22 and 23 and on the leading side in transport direction with the container bottom already on the outer slideway 6 and then with the container bottom on both slideways 6 and 7.

Furthermore, the container input 4 or the conveyor belts 22 and 23 there and/or retainer elements (not depicted) provided on the container input 4 for the containers 2 are controlled so that the feeding of each container 2 into the transport path 3 is completed before a carrier 14 reaches the transition area between the container input and the transport path 3, so that the containers 2 moved into the transport path 3 can be carried reliably by the carriers 14 and moved along the transport path 3.

On the container output 5 the two slideways 6 and 7 respectively end in a slideway 28 formed in the depicted embodiment by guide plates 26 and 27 for the container bottom. The two guide plates 26 and 27, of which guide plate 26 is fastened on the outer braces 11 and guide plate 27 is fastened on the inner support construction 12 of the machine frame 10, form between them a gap 29 for the passage of the respective upper carrier section 14.1 of the carriers 14. On the slideway 28, furthermore, two conveyor belts 30 and 31 are provided with the drive 32 for further transport of the containers 2 from the container output 5 to the external conveyor (not depicted).

In the simplest scenario the spiral conveyor 1 is used as a conveyor or transport device, which enables with a compact size and therefore especially in limited spatial conditions, conveying of containers 2 from a lower level to a higher level.

Preferably, however, the spiral conveyor 1 is part of an apparatus for treating the containers 2, for example part of a container cleaning system and/or container washing system, in which the containers 2 are moved at least on the transport path 3 through various treatment zones, which are formed for example by spray nozzles for spraying the inside and outside of the containers. In this case it is then in particular also possible to equip the carriers 14 or elements circulating with the latter with additional nozzles, which execute an additional treatment or spraying of the circumferential sides of the containers 2 oriented crosswise to transport direction A and/or the container bottoms etc.

In particular when embodied as a container cleaning or washing apparatus the machine frame is designed as an outwardly closed housing. The container input and the container output are likewise preferably designed with a tunnel-like housing element indicated by 33 and 34 in the drawings. Further, the interior of the apparatus comprising the transport path 3 is then provided with a wall 35 designed as a collection trough beneath the transport path.

Beneath the wall 35, various functional elements are then provided in the machine frame 10, for example at least one container for the cleaning and washing fluid, especially also at least one container for the cleaning and washing fluid collected in the collection trough (wall 35) and recirculated, at least one pump etc.

Through the described embodiment, especially through the use of the support ring 15, it is possible to provide, without design complexity, functional elements for cleaning the containers 2, especially spray nozzles and their supply lines, within the space enclosed by the transport path 3 and therefore especially to enable spraying of the containers 2 in a radially outward axis direction relative to the machine axis MA.

The spiral conveyor 1 is for example part of a drier, i.e. the apparatus for drying the containers 2 previously cleaned or washed in a further apparatus. In this case, outputs or nozzles for blowing out the containers 2 with an air stream are provided along the transport path 3 within the likewise closed housing. Beneath the wall 35 there are then components for creating the blast air.

Figure 3:
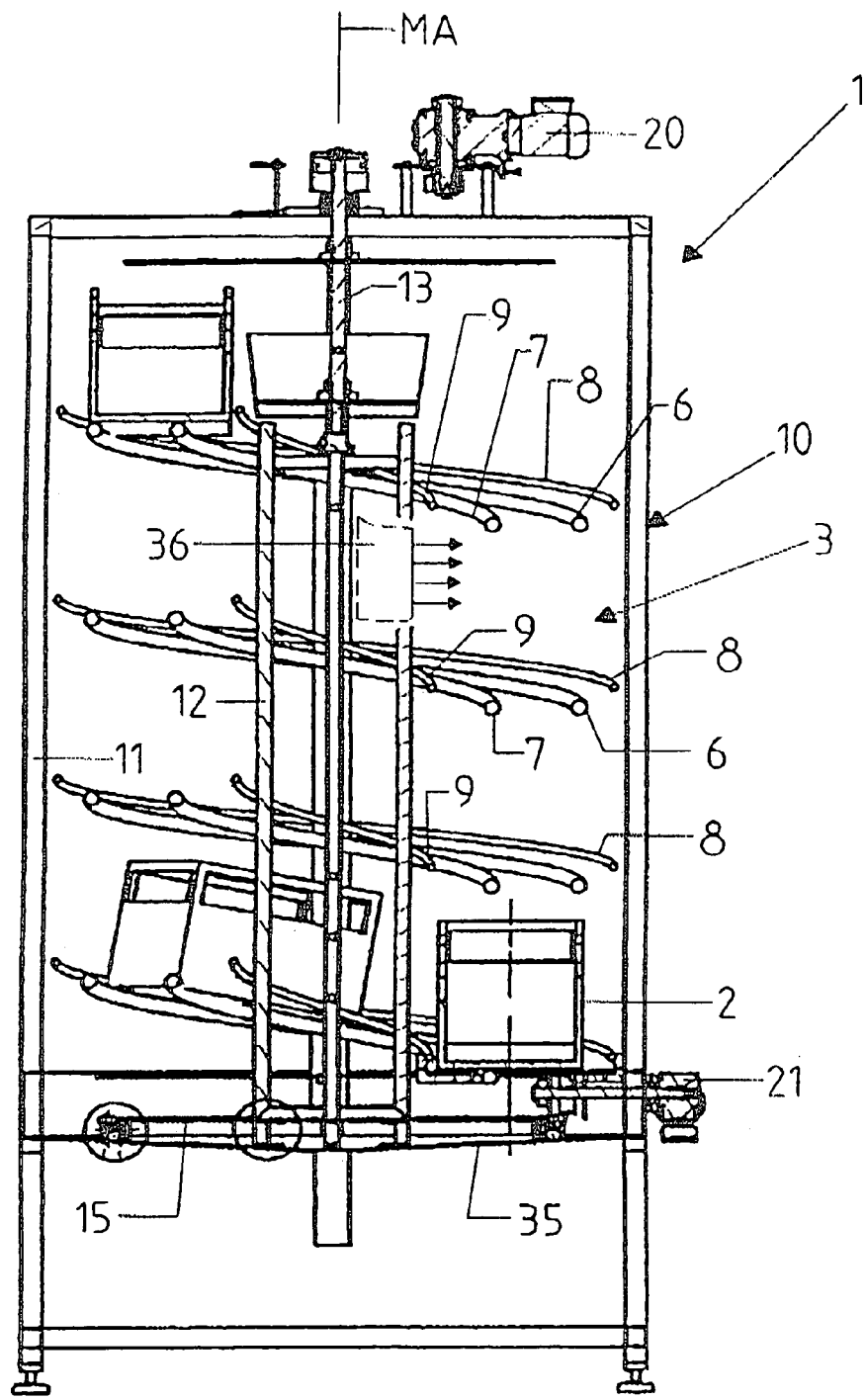
FIG. 3 shows a cross section corresponding to line 1-1 of FIG. 2.
Figure 4:
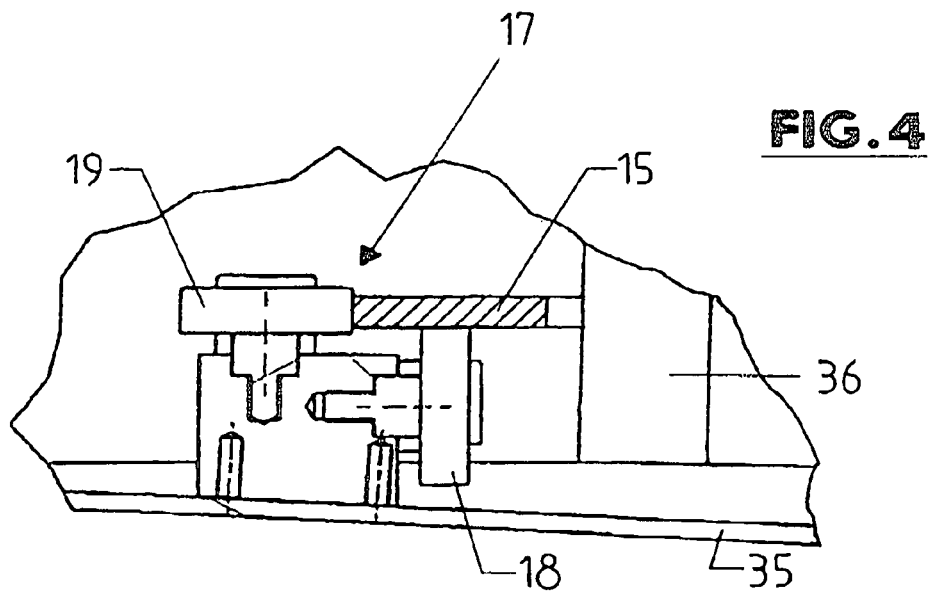
FIG. 4 shows an exploded partial view of one of the bearings of the lower support ring of the conveyor of FIGS. 1-3.

The described embodiment of the spiral conveyor 1 and in particular the use of the support ring 15 offers significant advantages especially when this conveyor is designed as a drier for drying the containers 2 by blowing air. Through the described embodiment it is easily possible to arrange the supply lines for the blast air, which have a relatively large diameter and for example slot-shaped nozzle openings, within the space enclosed by the spiral transport path 3, as indicated in FIG. 3 by dashed lines at 36. The supply lines are then connected by the support ring 15 with an apparatus (not depicted) provided beneath the bottom 35 for generating the blast air. The slot-shaped nozzles generate a blast air stream directed radially outward relative to the machine axis MA, which (stream) also, supported by centrifugal forces affecting residual fluid on the containers 2, achieves effective drying of the containers 2.

The invention was described above based on an exemplary embodiment. It goes without saying that numerous modifications and variations are possible. It is possible, for example, with a corresponding design of the container input 4 and/or of the container output 5, to execute treatment of the containers 2 there, for example in the area of the container input 4, pre-treatment of the containers by pre-spraying, and/or on the container output 5, blowing out of the containers for at least initial removal of cleaning and washing fluid.

In the described embodiment the bearing support of the lower carrier element formed by the support ring 15 is at a radial distance from the machine axis MA which (distance) is equal to or essentially equal to the radius of the support ring 15. Other embodiments are also possible; however, the radial distance is preferably at least 50% of the radius of the support ring 15.

As the drawings show, the container input 4 and the container output 5 in the depicted embodiment are provided on a common side of the machine frame 10, namely corresponding to the tangential course of the transport direction A at the container input 4 and at the container output 5 in relation to the course of the transport direction within the transport path 3 on different vertical sides of the machine frame 10. Of course, other embodiments are also conceivable. It was further assumed above that the containers 2 are moved from bottom to top along the transport path 3. It is generally also possible, in particular with a corresponding slight incline of the spiral transport path 3, to move the containers 2 in the opposite direction, from the top end to the bottom end of the transport path.

Reference List 1 spiral conveyor
2 container
3 transport path
4 container input
5 container output
6, 7 slideway
8, 9 guide rail
10 machine frame
11 brace
12 inner support structure
13 shaft 14 carrier or driver
14.1-14.3 carrier section
14.4, 14.5 stay
15 support ring
16 wheel
17 bearing mechanism
18, 19 roller
20, 21 drive
22, 23 conveyor belt
24 drive
25 transport element
26, 27 guide plate
28 slideway
29 slot
30, 31 conveyor belt
32 drive
33, 34 cover or additional housing
35 bottom
36 supply line for blast air
A transport direction

What is claimed is:

1. A spiral conveyor for containers in the form of transport crates, comprising at least one transport path spirally enclosing a machine axis (MA), the transport path is defined by, relative to the machine axis (MA), outer container or guide slide elements and by, relative to the machine axis (MA), inner guide or slide elements, and extends between a container input and a container output, and comprising at least one driver or carrier, which extends over an entire, or nearly an entire, length of the spiral formed by the transport path and reaches through the transport path or its spiral in an area between the outer container guide or slide elements and the inner container guide or slide elements and is held on at least two carrier supports or carrier elements which are rotationally driven on the machine axis (MA), wherein at least one of the carrier elements is a rotating support ring with a bearing at a radial distance from the machine axis (MA).

2. The spiral conveyor according to claim 1, wherein the support ring is part of a turntable or is connected with a turntable.

3. The spiral conveyor according to claim 1, wherein the support ring is mounted on bearing mechanisms offset on the machine axis (MA) and at a radial distance from the latter, said bearing mechanisms providing both axial and radial support of the support ring.

4. The spiral conveyor according to claim 1, wherein the at least one carrier is fastened on a support ring and on a wheel which is rotationally driven on the machine axis (MA).

5. The conveyor according to claim 1, wherein the at least one carrier is fastened on at least two support rings.

6. The spiral conveyor according to claim 1, wherein the at least one carrier is held at least on both ends on a carrier element, respectively.

7. The spiral conveyor according to claim 1, wherein the machine axis (MA) is a vertical or horizontal axis.

8. The spiral conveyor according to claim 1, wherein the container input or the container output are for a transport direction (A) of the containers tangential or essentially tangential to the transport direction (A) of the transport path.

9. The spiral conveyor according to claim 1, wherein the container input comprises at least one transport element, in a form of a conveyor belt, which is oriented tangentially or essentially tangentially relative to the outer container guide or slide elements.

10. The spiral conveyor according to claim 1, wherein the container input comprises at least one transport element, in a form of a conveyor belt, which is oriented tangentially or essentially tangentially relative to the inner container guide or slide elements.

11. The spiral conveyor according to claim 9, wherein the transport elements end at the outer container guide or slide elements.

12. The spiral conveyor according to claim 2, wherein the container output forms at least one sliding or transport plane for the containers.

13. The spiral conveyor according to claim 12, wherein at least one slot is provided in a transport or sliding plane for the at least one carrier intersecting said transport plane.

14. The spiral conveyor according to claim 2, wherein the container input and the container output are provided at different height levels, the container output being higher than the container input.

15. The spiral conveyor according to claim 1, wherein the container input and the container output are provided on a common side of a machine frame of the spiral conveyor.

16. The spiral conveyor according to claim 1, further comprising a common drive or separate, synchronized drives for the carrier elements.

17. The spiral conveyor according to claim 1, wherein the conveyor is a device for treating, cleaning or drying the containers.

18. The spiral conveyor according to claim 17, wherein within a space surrounded by the transport path, functional elements are provided for treating, for cleaning or for drying the containers, supply lines, channels, or said functional elements.

19. The spiral conveyor according to claim 4, further comprising, beneath the support ring, a wall provided as a trough.

20. The spiral conveyor according to claim 1, wherein at least one lower carrier element is a support ring.

21. The spiral conveyor according to claim 20, wherein the radial distance of the bearing of the at least one carrier element is equal to or essentially equal to a radius of the support ring, but at least greater than 50% of the radius of the support ring.

* * * * *